A. M. SOUTHARD.
WINDSHIELD.
APPLICATION FILED OCT. 10, 1919.
1,390,652. Patented Sept. 13, 1921.
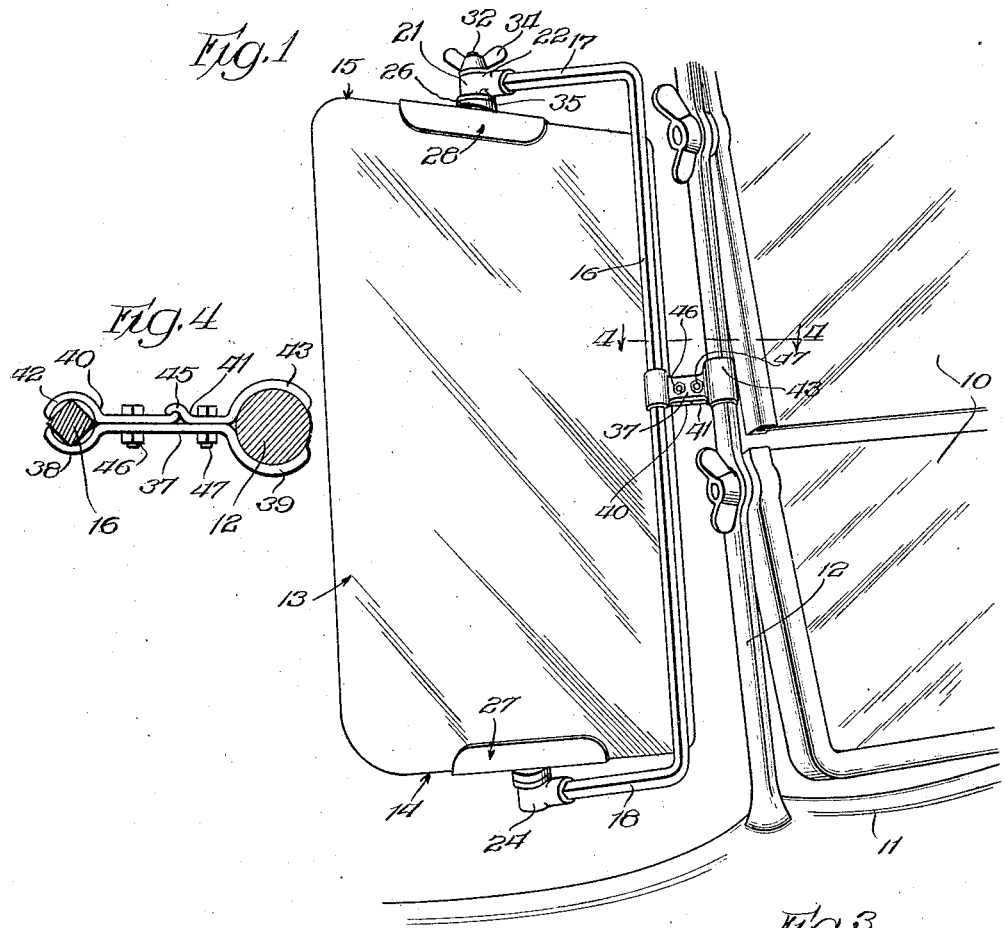
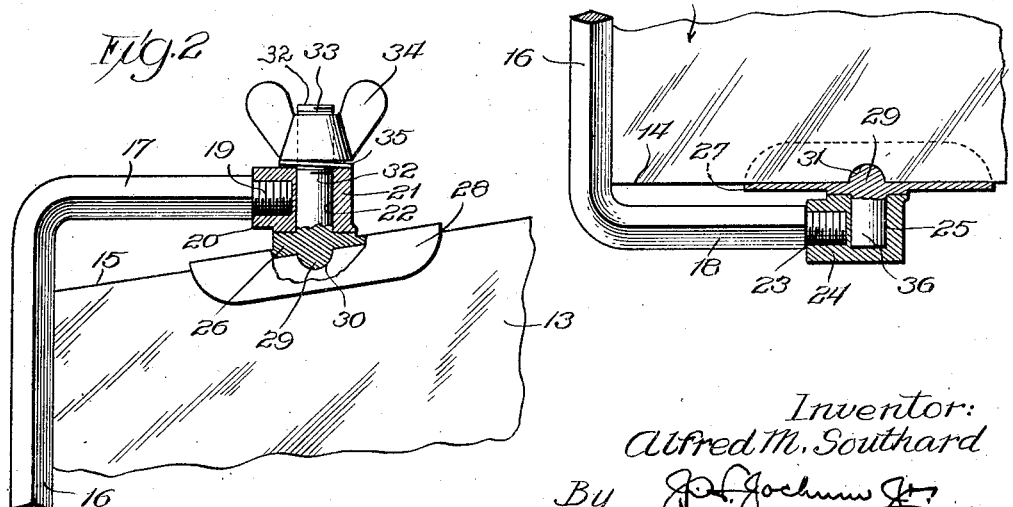
Inventor:
Alfred M. Southard

UNITED STATES PATENT OFFICE.

ALFRED M. SOUTHARD, OF CHICAGO, ILLINOIS, ASSIGNOR TO TAYLOR-SOUTHARD COMPANY, A CORPORATION OF WISCONSIN.

WINDSHIELD.

1,390,652.   Specification of Letters Patent.   Patented Sept. 13, 1921.

Application filed October 10, 1919. Serial No. 329,740.

*To all whom it may concern:*

Be it known that I, ALFRED M. SOUTHARD, a citizen of the United States, residing at Chicago, in the county of Cook and State of Illinois, have invented certain new and useful Improvements in Windshields, of which the following is a specification.

This invention relates to improvements in wind shields particularly adapted, though not necessarily limited in its use on automobiles, and one of the objects of the invention is to provide an improved shield of this character which is adapted for use in connection with the wind shield now so commonly used, and is so adapted as to be adjusted so that the wind may be deflected from the ends of the usual wind shield for any desired extent and beyond the sides of the rear of the vehicle.

Heretofore with shields of this character considerable difficulty has been experienced in adjusting and holding the same in proper position because of the manner in which the shield is mounted upon its supporting bracket. It has been found that after the prior shields have been used for any length of time they become loosened in their bearings, with the result that the transparent or glass shield will vibrate against the framework, causing an objectionable chatter and oftentimes resulting in the cracking or breaking of the shield.

To overcome these objections and difficulties and to provide improved means for mounting and holding the shield and for securing the same in its adjusted position is another object of the present invention.

To the attainment of these ends and the accomplishment of other new and useful objects as will appear, the invention consists in the features of novelty in substantially the construction, combination and arrangement of the several parts hereinafter more full described and claimed and shown in the accompanying drawing illustrating this invention, and in which:

Figure 1 is a perspective view of a portion of an ordinary wind shield having a supplemental shield constructed in accordance with the principles of this invention attached thereto.

Fig. 2 is an enlarged detail view of one portion of the shield with parts in elevation, parts in section and parts broken away.

Fig. 3 is a view similar to Fig. 2 of another portion of the shield.

Fig. 4 is a detail sectional view taken on line 4—4, Fig. 1.

Referring more particularly to the drawing the numeral 10 designates the ordinary wind shield mounted upon a motor vehicle 11 and having the usual upright 12 to which the shield elements are pivotally connected.

The numeral 13 designates a supplemental shield which may be of any desired size and configuration but preferably is constructed of a transparent material such as glass having its lower edge 14 substantially straight and its upper edge 15 inclined so as to adopt the shield for use in connection with any other wind shield. That is to say with wind shields which are normally in an inclined position the shield 13 is applied so that the inclined edge 15 will be at the upper edge thereof, but with vehicles having the ordinary wind shield arranged vertical or in a straight up and down position, the shield 13 may be reversed so that the edge 14 is uppermost and thereby conform to the contour of the other parts of the vehicle.

The shield 13 is mounted and held in position by means of a suitable frame constructed preferably of a bar or rod 16 preferably angular in cross section and the ends of the bar are deflected as at 17—18 to form spring arms which may extend for any desired distance beyond the body portion 16. The extremity of the arm 17 is preferably threaded as at 19 and is adapted to enter a threaded socket 20 in a bearing element 21, which has a bearing 22 extending vertically therethrough. The arm 18 is similarly threaded as at 23 and is adapted to engage a threaded socket in a bearing element 24 having a bearing 25 therein.

Clip members 26—27 are provided for holding the shield 13 by its edges. Each of these clip members is provided with spaced jaws 28 and intermediate the jaws and between the ends thereof is a lug or projection 29. The shield 13 is provided in its edge 15 with a cut away portion 30 opening through the edge and a similar cut away portion 31 is provided in the edge 14 of the shield so that when the shield is placed in position between the holding members 26—27 the projection 29 will enter the respective cut away portions 30—31 in the edges of the shield to hold the shield against displacement lengthwise of the holding members. The member 26 is connected with the arm 17 by means of a stud or bearing 32 which enters the bearing 22 in the element 21 to extend therebeyond and its free end is threaded as at 33 to receive a wing or thumb nut 34. If desired a spring washer 35 may be interposed between the nut 34 and the element 21.

The member 27 is connected with the element 24 by means of the bearing or stud 36 which is journaled in the bearing 25 of the element 24.

Inasmuch as the arms 17—18 of the supporting members 16 are flexible or of a springy nature it will be manifest that when the shield 13 is placed in position between the members 26—27, the shield will be gripped by the member and inasmuch as the projections 29 enter the recesses 30—31 in the edges of the shield, it will be seen that the shield cannot become accidentally displaced from its supporting frame.

When it is desired to remove the shield, all that is necessary is to spring the arms 17—18 away from each other and the projections 29 on the members 26—27 will become unseated from the respective recesses 30—31 so that the shield may be readily slipped from the frame.

When the angle of inclination of the shield is changed or it is desired to swing the shield about the pivots formed with the supporting frame, the nut 34 may be loosened and the shield swung about its axis, after which the nut may be tightened and the shield will be maintained in its adjusted position.

Any suitable means may be provided for securing the shield and its frame in position, such, for instance, as a clip shown more clearly in Fig. 4 and which clip embodies a main body portion 37 having seats 38—39 adapted to respectively receive the members 16—12 the coöperating members 40—41 being respectively provided with seats 42—43 to coöperate respectively with the seats 38—39. The members 42—43 may be connected by means of a suitable joint 45 and suitable fastening devices 46—47 may be provided for holding the parts of the clip together and for causing the coöperating parts to respectively grip the members 16—12.

With this improved construction it will be manifest that it is not necessary to drill or bore any holes through the shield which would tend to weaken the same, and it will also be manifest that the shield may be adjusted to any angle and maintained in its adjusted position so that it will not vibrate or strike against the supporting frame which would tend to cause the shield to become broken.

While the preferred form of the invention has been herein shown and described it is to be understood that various changes may be made in the details of construction and in the combination and arrangement of the several parts within the scope of the claims without departing from the spirit of this invention.

What is claimed as new is:—

1. A wind shield embodying a supporting structure, said structure embodying a rigid upright, laterally projecting spring arms arranged at the opposite ends of the upright, a socket bearing carried by one of the arms, a bearing carried by the other arm, a wind shield, a clip removably engaging one end of the shield, a portion of the clip being shaped to form a trunnion journaled in said socket, a clip removably engaging the opposite end of the shield, a stem carried by the last said clip, said stem passing through the second recited bearing, the end of said stem being threaded, and a nut engaging the said threads and coöperating with the bearing to frictionally bind the shield against movement with respect to the said support.

2. A wind shield embodying a supporting structure, said structure embodying a rigid upright, laterally projecting spring arms arranged at the opposite ends of the upright, a socket bearing carried by one of the arms, a bearing carried by the other arm, a wind shield, a clip removably engaging one end of the shield, a portion of the clip being shaped to form a trunnion journaled in said socket, a clip removably engaging the opposite end of the shield, a stem carried by the last said clip, said stem passing through the second recited bearing, the end of said stem being threaded, and a nut engaging the said threads and coöperating with the bearing to frictionally bind the shield against movement with respect to the said support, the edge of the shield and the adjacent clip being provided one with a projection and the other with a recess to receive the projection for holding the clip or shoe against relative displacement.

3. A wind shield embodying a supporting structure, said structure embodying a rigid upright, laterally projecting spring arms arranged at the opposite ends of the upright, a socket bearing carried by one of the arms, a bearing carried by the other arm, a wind shield, a clip removably engaging one end of the shield, a portion of the clip being shaped to form a trunnion journaled in said socket, a clip removably engaging the opposite end of the shield, a stem carried by the last said clip, said stem passing through the second recited bearing, the end of said stem being threaded, a nut engaging the said threads and coöperating with the bearing to frictionally bind the shield against movement with respect to the said support, and a bracket connected with the said supporting element intermediate the said arms, said bracket and supporting element being adjustable one with relation to the other in two different directions.

In testimony whereof I have signed my name to this specification, on this 7th day of October, A. D. 1919.

A. M. SOUTHARD.